(12) United States Patent
Goker et al.

(10) Patent No.: US 6,470,291 B1
(45) Date of Patent: Oct. 22, 2002

(54) VELOCITY FEEDBACK MEASUREMENT METHOD

(75) Inventors: Turguy Goker, Solano Beach; Edward H. Patrick, Whittier; Stanley S. Tang, Irvine, all of CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 0 days.

(21) Appl. No.: 09/404,604

(22) Filed: Sep. 24, 1999

Related U.S. Application Data (60) Provisional application No. 60/101,842, filed on Sep. 25, 1998.

(51) Int. Cl.[7] ............................................. G11B 15/52
(52) U.S. Cl. ..................... 702/145; 702/33; 702/38; 702/44; 702/79; 702/105; 702/145
(58) Field of Search .............................. 702/33, 38, 44, 702/57, 65, 79, 96, 105, 108, 113–115, 124, 126, 125, 142, 145–148, 163, 165, 182–184, 188, FOR 103, FOR 1.4, FOR 109, FOR 123, FOR 124, FOR 130, FOR 134, FOR 135, FOR 150, FOR 151, FOR 155, FOR 170, FOR 171; 388/6, 603, 811, 804, 921; 360/73.14

(56) References Cited

U.S. PATENT DOCUMENTS

| | | | |
|---|---|---|---|
| 4,125,881 A | 11/1978 | Eige et al. | 360/50 |
| 4,739,950 A | 4/1988 | Goker et al. | 242/203 |
| 5,576,905 A | 11/1996 | Garcia et al. | 360/73.14 |
| 5,642,461 A | 6/1997 | Lewis | 388/812 |

*Primary Examiner*—Marc S. Hoff
*Assistant Examiner*—Carol S W Tsai
(74) *Attorney, Agent, or Firm*—McDermott, Will & Emery (57) ABSTRACT

To provide accurate measurement of rotational velocity and an adequate bandwidth for servo control as a function of the measurement over a wide range of velocities, the present invention utilizes unique speed computation algorithms based on a combination of fine and coarse shaft velocity measurements from a tachometer. The preferred embodiments utilize control signals derived from the velocity measurements to control motor speed, for example, to provide servo control of a digital tape drive. The preferred embodiments utilize an optical encoder coupled to a reel-shaft to generate tachometer pulses as the shaft rotates. The coarse measurement may actually take two different forms for different speed ranges. In one range, this measurement involves counting the number of pulses in a sampling interval. In the other range, the coarse measurement entails counting the number of sampling intervals per detection of a tachometer pulse. The fine velocity measurement is based on detection of differences in time delays between certain ones of the tachometer pulses and the edges of one or more of the sampling intervals. The delay detections may entail counting pulses of a clock signal, which has a rate substantially higher than the sampling rate, for periods between certain tachometer pulses and the edges of one or more of the sample intervals. The fine measurements provide a correction in the speed calculation for variations in phase relationship between the sampling and the tachometer pulses.

12 Claims, 4 Drawing Sheets

VELOCITY FEEDBACK MEASUREMENT METHOD

RELATED APPLICATIONS

This application claims the benefit of U.S. Provisional Application No. 60/101,842, entitled "Velocity Measurement Method" filed on Sept. 25, 1998 by Turguy Goker and Edward H. Patrick, the disclosure of which is entirely incorporated herein by reference.

FIELD OF THE INVENTION

This invention relates to a technique for measuring the rotational speed or velocity of a motor shaft, such as the drive shaft of a tape reel in a data tape cartridge system, and providing feedback for servo control of the motor.

BACKGROUND

Computers utilize a variety of magnetic media devices for the storage of software programs and data. Information recorded on the magnetic medium takes the form of flux transitions that represent the binary "1's" and "0's" that form the digital information. Tape cartridges, such as single-reel tape cartridges, are commonly used in library or other archival data storage applications. In such applications, a drive mechanism typically provides bi-directional tape motion during read/write and locate/rewind operations. The single-reel cartridge design uses a take-up reel located inside the drive. A coupler grabs a leader pin at the start of the tape and draws it out of the cartridge and around the tape head to the take-up reel in the drive. After the leader pin is secured in the take-up reel, the take-up reel rotates and pulls the tape through the tape path. A gear built into the cartridge reel and a gear coupled to the drive reel motor form a clutch enabling the motor to drive the rotation of the tape reel within the cartridge. A separate motor drives the take-up reel. By selective operations of the drive motors, the tape drive can selectively withdraw tape from the cartridge and wind tape back into the cartridge. A drive intended for a two-reel (reel-to-reel) cartridge includes two clutches for engaging the tape reels within the cartridge. Separate motors drive the clutches, to rotate the reels first in one direction and later in the opposite direction, to wind the tape back and forth between the two reels.

The environment of such digital cassette tape drives imposes a number of requirements on the tape transport. For example, in many cases, the linear velocity of the tape at the record/playback head must be constant. The drive may actually read data from the tape during transport past the head(s) during transport in both directions. Different speeds are necessary for read/write operations and scanning operations to rapidly find a desired location on the tape. A number of techniques have been developed to determine and control tape speed based on measurement of the rotational speed of one or more of the reels.

In general, tape drives include elements to detect the speed of the tape from the rotational speed of the take-up reel and control the tape transfer by a feedback control system. For example, the shaft speed of one of the reels is detected and used to calculate the tape speed. Logic circuitry or programming serves to compare the tape speed with a tape speed command or desired setting. If the tape speed too low, the circuitry increases the drive current to a take-up reel motor to increase the torque of the take-up reel and accelerate the take-up reel and the tape. If the detected tape speed is too large, the current is adjusted to reduce the torque of the take-up reel motor to decelerate the motor and the tape.

For example, U.S. Pat. No. 4,125,881 to Eige et al. describes a reel-to-reel magnetic tape drive, which moves tape from one reel to another past a read/write head. A fine-line tachometer, mounted on one reel shaft, provides a fine-line reading in the form of a number of pulses per revolution. A second tachometer on the second reel shaft provides a single pulse per revolution of the second reel. The single pulse is used to gate the counting of fine-line tachometer pulses for each revolution of the second reel. Motor acceleration currents of a magnitude corresponding to the reel radii are generated to drive the reel motors. A servo algorithm uses the gated per-revolution fine-line tachometer count to determine the reel radii based upon the actual length and thickness of the magnetic tape, for common control of servo drivers for both the source and take-up reel motors.

U.S. Pat. No. 4,739,950 to Goker et al. discloses a system that moves magnetic tape past the read/write head at a constant velocity by separately servo controlling the source reel motor and the take-up reel motor. Separate fine encoders associated with each reel provide multiple pulses for each revolution of the respective reel. Two radius calculation circuits each receive pulses from a respective one of the encoders and each calculate therefrom the radius values of tape on both of the reels. A radius information selector then selects, for use in controlling the motors, that set of radius values that is calculated by the calculation circuit which is receiving encoder pulses at the greater sampling rate. Separate servo circuits drive the two motors at respective angular velocities determined by utilizing the selected set of radius values. In each drive circuit, the associated tape radius is multiplied by the actual reel angular velocity, as indicated by the time duration between consecutive pulses from the encoder associated with that reel. Each servo maintains this product equal to a preselected tape linear velocity value, thereby causing the separate motors to rotate the reels so as to establish the desired constant linear tape velocity.

U.S. Pat. No. 5,576,905 to Garcia et al. discloses a bi-directional, reel-to-reel tape transport in which magnetic tape can be moved in either of two opposing directions for data recording thereon. Control of tape position is implemented in a servo algorithm that uses tachometer inputs to determine parameter values for generating reel motor drive currents. A fine-line tachometer is mounted on each of two reels in the tape drive and multiplexing selects the fine-line output from the tachometer on the reel supplying tape for use in the servo algorithm.

U.S. Pat. No. 5,642,461 to Lewis discloses a wide range speed control system for a brushless DC motor, which uses a magneto resistive encoder. The encoder is coupled to a series of filters, which remove DC level and harmonic distortions from the resulting encoder signal. These filtered signals are then applied to the motor to control motor rotation speed. The speed control algorithm may be implemented in a microcontroller.

All of these tape speed control techniques rely on an accurate tachometer measurement to determine the motor or reel shaft speed. In most cases, the tachometer measurement utilizes an optical encoder associated with the shaft. The optical encoder generates a certain number of tachometer pulses during each revolution of the motor shaft. For example, a typical fine tachometer may generate a thousand pulses per revolution. In most modern servo systems, the speed measurement entails counting the optical tachometer pulses during a predetermined measurement period defined by the sampling rate of the motor control servo loop. The sample rate is defined based on the servo bandwidth and the computation power of the control processor.

Typically, the sample rate is constant, and the number of pulses counted changes with the speed of the motor. The higher sampling rate enables the servo system to make corrective changes more often but results in fewer pulses per sample, thereby reducing accuracy. As desired speeds increase, the number of tachometer pulses counted in an interval of the sampling clock also increases. If the sample time is long enough and the motor rate is high enough, there will be large count values, which produce satisfactory measurement accuracy. However, as the sample time period increases, the achievable servo bandwidth decreases, causing performance problems.

In many cases, a tape drive must operate at variable speeds, over a broad range. If the sample interval is set for accurate control at the high end of the range, the minimum speed may be so slow that there may not be enough counts to provide adequate servo measurement resolution. In some cases, there may be no tachometer pulses at all during some sample intervals.

It is possible to operate with different sample intervals, for different ranges of motor speeds. However, this radically complicates the control algorithm. The algorithm is a function of the bandwidth, the motor dynamics and the sample time. Changing the sample time on the fly, as the motor transitions between different speeds, requires changing the coefficients on the fly. Rather than recalculate coefficients, many tape drive servo systems operate in an open-loop configuration during transitions, for example during a ramp-up in speed.

If the specification for the servo control operation requires regulation to ±0.5%, then the measurement accuracy must be less than ±0.05%, that is to say better by a factor of 10. If the motor rotational speed is 1800 RPM and the servo sample time is 1 ms (1000 hz sampling rate), the optical encoder would need to produce 60,000 tachometer pulses per revolution. Such a fine tachometer is simply not economically feasible for high-volume, low-cost tape drives.

From the above-discussion of existing servo control systems, particularly those for tape drives, it becomes apparent that a need still exists for a servo control technique providing a high degree of accuracy over a wide range of motor speeds while still using a constant sampling rate or interval. Any such system should provide adequate accuracy and bandwidth with readily available tachometer equipment, such as an optical encoder that may produce approximately 1000 pulses per revolution.

SUMMARY OF THE INVENTION

The present invention addresses the above-stated needs by utilizing unique velocity computation algorithms, based on a combination of fine and coarse velocity measurements from an optical encoder or similar tachometer device. The preferred embodiments utilize control signals derived from the velocity measurements to control motor speed, for example, to provide servo control of a digital tape drive.

Hence, one aspect of the invention relates to a servo system for controlling a motor. The servo system includes a tachometer coupled to a shaft rotated by the motor. The tachometer generates a predetermined number of pulses in response to each rotation of the shaft. The servo system also includes means operating at a specific, constant sampling rate for taking fine and coarse measurements of shaft speed in response to a plurality of the pulses and for controlling the motor based on the measurements.

In the preferred embodiments, the tachometer takes the form of an optical encoder coupled to a shaft associated with the drive motor for a tape drive reel. A typical fine tachometer of this type may generate a thousand pulses per revolution of the shaft. In the preferred embodiments, the means for sampling and controlling implement the unique algorithm. Specifically, the algorithm entails a coarse measurement based on the sampling rate and the tachometer pulses. The coarse measurement may actually take two different forms for different speed ranges. In one range, this measurement involves counting the number of pulses in a sampling interval. In the other range, the coarse measurement entails counting the number of sampling intervals spanning detection of tachometer pulses. The algorithm also utilizes a fine measurement, based on detection of differences in time delays between certain ones of the tachometer pulses and edges of one or more of the sampling intervals. The fine measurements of the delays may entail counting pulses of a clock signal, which has a rate substantially higher than the sampling rate, for periods between certain tachometer pulses and the edges of one or more of the sample intervals. The fine measurements provide a correction in the speed calculation for variations in phase relationship between the sampling and the tachometer pulses.

Hence, another aspect of the invention relates to a rotational velocity measurement system. This system includes a tachometer and a clock circuit. In operation, the tachometer is coupled to a shaft rotated by a motor. The tachometer generates a predetermined number of pulses in response to each rotation of the shaft. A processor calculates a value related to the rotational velocity. This processor is responsive to the tachometer pulses and the clock signal. In operation, the processor samples tachometer pulses during sampling intervals defining a constant sampling rate lower than the clock signal. The processor also counts cycles of the clock signal, to measure delays between certain ones of the pulses and next subsequent sample interval boundaries. The processor calculates the value related to the rotational velocity as a function of a count derived from the pulse sampling and a difference between two of the measured delays.

The processor may take the form of a collection of discrete logic circuits for performing the counting and calculation operations. Preferably, the velocity measurement algorithm is implemented in the processor of a microcontroller.

Another aspect of the invention relates to a preferred method for measurement of rotational velocity. The method involves generating a predetermined number of tachometer pulses during each revolution of a shaft driven by a motor. The tachometer pulses are sampled at a constant predetermined sampling rate. The method derives a value related to the rotational shaft velocity. However, a different procedure is used to arrive at the value, depending on the speed range, as indicated by the relationship of the pulse rate to the sample interval. If there are a plurality of tachometer pulses within each sample interval, the method involves measuring a delay between a last tachometer pulse detected before the start of one sample interval and the start of the one sample interval, counting the tachometer pulses during the one sample interval, and measuring a delay between the last tachometer pulse detected during the one sample interval and the end of the one sample interval. In this case, the methodology calculates a first value related to rotational shaft velocity, from the pulse count and the difference between the measured delays.

However, if there are not a plurality of tachometer pulses within each sample interval, the method uses a different series of substeps. In this later case, the substeps include measuring a delay between a first tachometer pulse and the start of a next subsequent sample interval, counting one or more sample intervals until after detection of a second tachometer pulse and measuring a delay between the second tachometer pulse and the start of a next subsequent sample interval. In this instance, the methodology calculates a second value related to rotational shaft velocity, from the interval count and the difference between the measured delays.

In the preferred embodiments, the tachometer generates pulses during revolution of a shaft used to drive a tape reel, for example in a digital tape drive. The shaft speed measurements may be used to calculate the speed of the tape past a tape head. The system applies a control signal to a motor, such as the drive motor for the tape reel, as a function of the measured speed and/or the calculated tape speed.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The embodiments provide accurate measurement of rotational velocity, based on a combination of fine and coarse shaft velocity measurements from a tachometer, preferably for servo control of a motor, such as the reel motor of a digital tape drive. The velocity measurement system uses a tachometer coupled to a shaft driven by the motor, to generate tachometer pulses as the shaft rotates. Preferably, in a high-velocity range the coarse measurement involves counting the number of pulses in a constant sampling interval. In a low-velocity range, the coarse measurement entails counting the number of the sampling intervals spanning detection of successive tachometer pulses. The threshold between these two ranges of operation relates to the number of tachometer pulses per interval (1 or more per interval for high velocity range), or the number of sample intervals between tachometer pulses (one or more intervals between pulses for low-velocity range).

The fine velocity measurement is based on detection of differences in time delays between certain ones of the tachometer pulses and the edges of one or more of the sampling intervals. The delay detections may entail counting pulses of a clock signal, which has a rate substantially higher than the sampling rate, for periods between certain tachometer pulses and the edges of one or more of the sample intervals. The actual phase differences measurements differ, depending on the velocity range. In the high-velocity range, the phase adjustment involves: (1) measuring the time delay between the last pulse before the sample interval and the start of the sample interval, and (2) measuring the time delay between the last pulse within the sample interval and the end of the sample interval. In the high-velocity range, the phase adjustment involves: (1) measuring the time delay between a first pulse and the start of the next later sample interval, and (2) measuring the time delay between the next pulse and the end of the sample interval overlapping the occurrence of the second tachometer pulse. In each range the velocity-related calculation includes computation of the difference in the two measured delays. As discussed more later, the calculation may use actual time values or use counts of signals.

Figure 1:
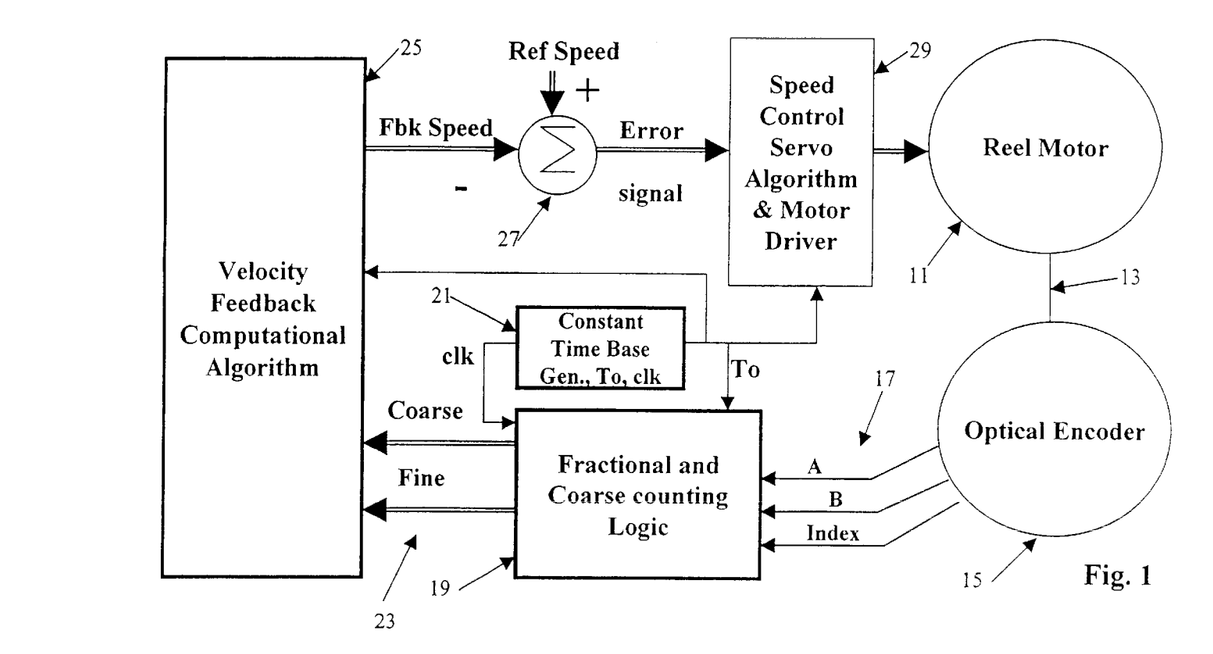
FIG. 1 is a block diagram of a servo system for controlling a reel motor of a digital tape drive, which utilizes a rotational velocity measurement in accord with the present invention.

FIG. 1 is a block diagram of a servo system implementing the speed measurement and attendant motor control of the present invention. A digital tape drive will typically include two reels and two associated reel motors. The invention may provide speed measurements and servo control for either or both of the reel motors. FIG. 1 shows one of the reel motors 11. When operating as a take-up (T) reel, the motor 11 drives the reel to wind the tape onto the reel. The motor includes or is coupled to a shaft, shown diagrammatically as the line 13 in the drawing. A tachometer, in turn, is coupled to the shaft 13. The shaft may be the same as that used to drive the reel.

Figure 2:
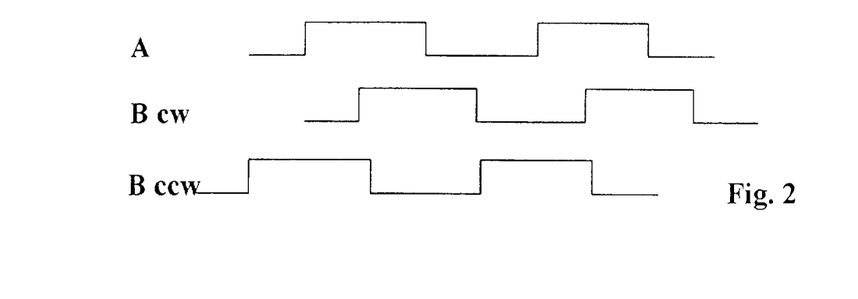
FIG. 2 is a signal diagram representing the pulse signals output by the Quadrature optical encoder, used as the tachometer in the servo system of FIG. 1.

The preferred embodiment utilizes an optical encoder 15 as the tachometer. During each revolution of the shaft 13, the optical encoder 15 generates certain output signals on the lines 17. In present implementations of the invention, the optical encoder 15 is a Quadrature type optical encoder. Such an encoder 15 has two pulse output lines A and B, and it produces an index pulse signal. In general, this type of encoder outputs N lines or pulses per revolution quadrature as well as one index pulse per revolution. The quadrature is N pulses of A and B phase shifted by 90 degrees (see FIG. 2). In currently practical implementations, for digital tape drives, N is 1000 lines or pulses per revolution.

The encoders 15 used in the presently preferred embodiments are readily available and are sufficiently economical in price to enable use in mass-produced tape drives or the like. Those skilled in the art will recognize that the inventive velocity measurement method could utilize other types of encoders, which may produce approximately the same number of pulses per revolution. Also, the number of pulses per revolution here is selected to optimize the performance for rotational speeds typically desired in current-generation digital tape drive products. Those skilled in the art will recognize that, for other desired operating ranges, encoders generating fewer or more pulses per revolution may be used without departure from the inventive concepts.

The optical encoder 15 supplies the quadrature pulse signals and the index signal over lines 17 to appropriate counting logic 19, for performing the coarse counting and the fine or fractional counting used in the inventive speed measurement. The counting logic 19 also receives certain clock signals from an appropriate constant time base signal generator 21. The generator 21 produces a signal at a constant rate or frequency and having a constant time period $T_0$. The generator 21 also produces a high-speed clock signal clk, typically at a rate ten times that of the $T_0$ sampling clock. In response to these various signals, the counting logic 19 performs coarse counting operations as well as fine or fractional counting operations.

The logic 19 actually performs a selected one of two possible types of coarse counting operations. In one mode of coarse counting, for relatively high-speed operations of the reel motor 11, the logic 19 counts the number of tachometer pulses on a selected one of the lines A or B from the encoder 15 for each sample interval $T_0$ of the sampling clock signal. In another coarse counting mode, for relatively low-speed operations of the reel motor 11, the logic 19 counts sample intervals from a detection of a first one of the tachometer pulses on a selected one of the lines A or B from the encoder 15 to detection of a second one of those pulses.

In response to the signals 17 from the optical encoder 15 and the clock signals from the generator 21, the logic 19 also performs a fine counting operation. Essentially, this counting operation determines the fraction of a sampling interval between detection of each of certain tachometer pulses and the next boundary between sampling intervals. These fine fractional counts represent the delay or phase difference between the tachometer signal and the sampling intervals. In practice, a fine measurement entails counting the number of fast clock pulses of signal clk between a particular tachometer pulse and the next edge of a sampling interval pulse.

The counting logic 19 periodically supplies coarse and fine count signals 23 to circuitry 25 for performing a velocity feedback computation. The circuitry 25 implements an algorithm, discussed in more detail later, to determine a value as a function of the speed of the shaft 13 driven by the reel motor 11. In the drawing, the result of this computation is represented by the value Fbk Speed. The circuit 25 supplies the Fbk Speed value to the negative input of a summing circuit 27. The circuit 27 also receives a value Ref Speed, as a reference value representing the desired speed of the shaft, on a positive input. The summing circuit 27 therefore generates an error signal, representing the difference between the measured value for feedback purposes (Fbk Speed) and the reference value (Ref Speed). This error signal is used by a servo control and motor drive circuit 29 to adjust the drive current applied to the reel motor 11. The circuit implements a drive algorithm to adjust the current to the motor 11 to provide the desired control-loop performance.

The counting logic 19 and the computation circuit 25 selectively operate in two different modes, one for high-speed motor operations, the other for low-speed motor operations. The logic and circuit select between the two modes based on a criteria relating to desired or actual speed of the motor and shaft. Preferably, the selection is based on detection of a predetermined relationship of the rate of the tachometer pulses to a threshold value.

Figure 3:
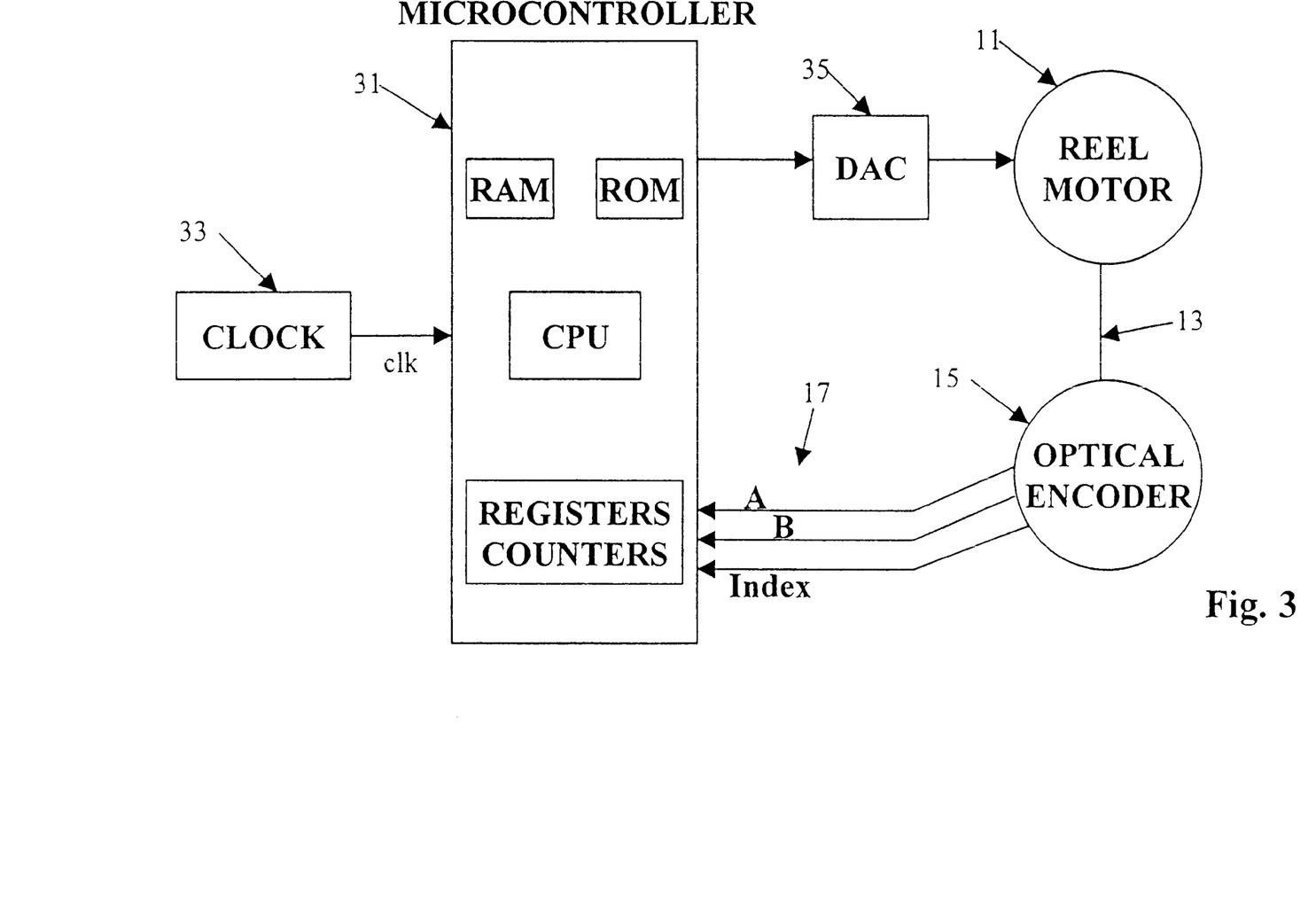
FIG. 3 is a simplified block diagram of a servo control system utilizing a microcontroller to implement the counting and speed computation.

The above discussion of the logic of the velocity or speed measurement and the servo control of the tape reel motor referred to a number of separate logic functions. Those skilled in the art will recognize that an actual implementation of such a system would preferably utilize a programmable microcontroller 31 (FIG. 3). Such a microcontroller typically includes or has coupled thereto random-access memory (RAM) for storing data and read-only memory (ROM) for storing control programming. A central processing unit (CPU) implements the program to process data in the desired manner. The CPU connects to or implements a number of counters and registers, to perform the counting and computation functions. In such an implementation, for example, a number of the counts performed by the logic 19 would appear in the registers of the microcontroller.

The microcontroller 31 receives a high-speed clock signal (clk) from clock circuit 33. The CPU will divide this signal down by an appropriate factor to derive the constant sampling interval clock to signal of period $T_0$. The microcontroller receives the signals on line 17 from the optical encoder 15, relating to the speed of the motor 11 and the shaft 13. The micro-controller 31 also connects to an appropriate interface, such as a digital to analog converter (DAC) 35, for generating one or more drive signals to control the speed of the tape reel motor 11. The programming of the microcontroller 31 causes that device to implement logic essentially similar to that shown in FIG. 1, to provide a velocity measurement and servo control for the motor, in accord with the invention.

Figure 4:
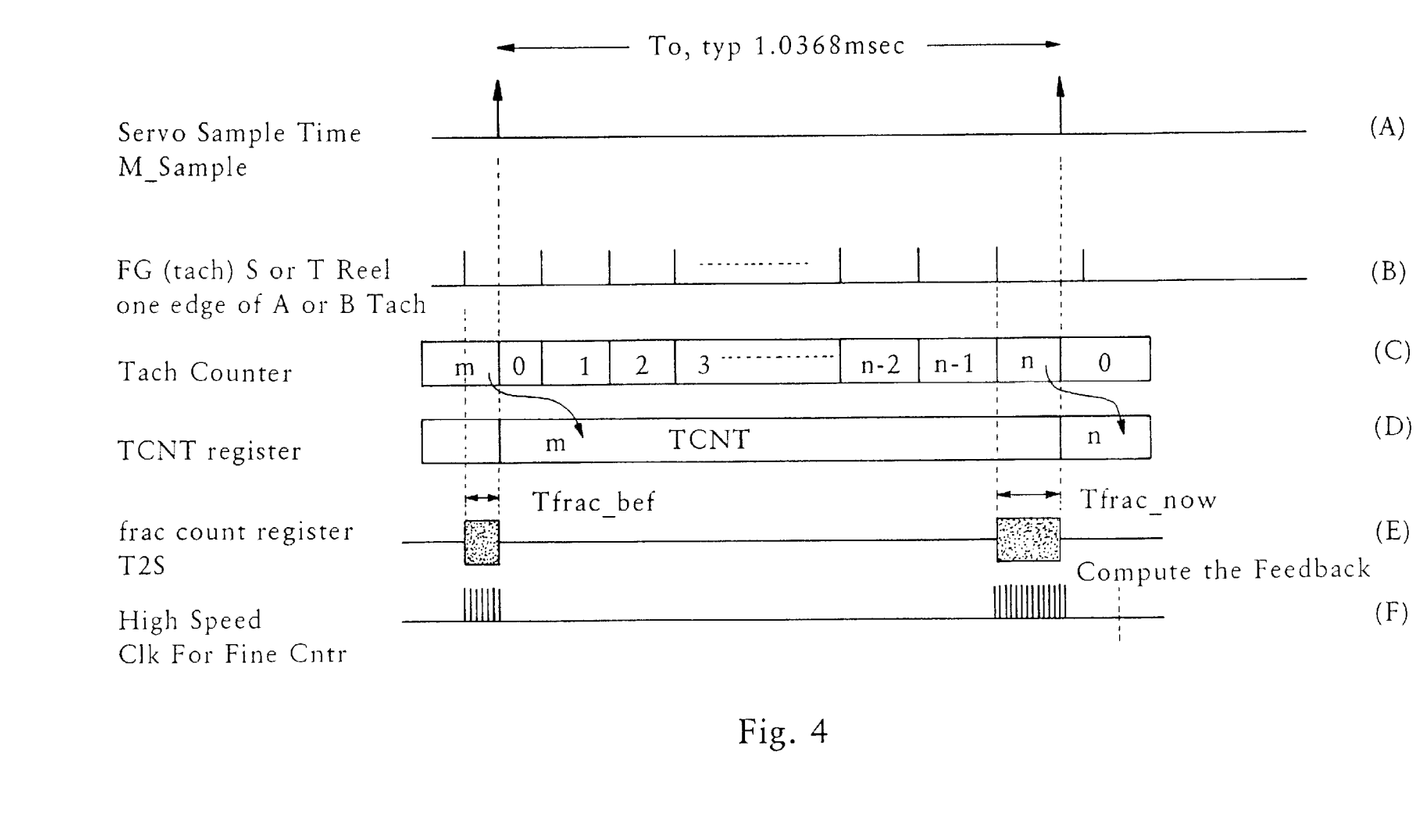
FIG. 4 is a signal diagram useful in explaining the steps of measuring rotational velocity, in the higher of two ranges, in accord with the present invention.

FIG. 4 shows a number of different signals and the timing relationships thereof, involved in a velocity measurement in accord with the invention. In the example shown in FIG. 4 it is assumed that the shaft velocity is sufficiently high that there are one or more tachometer pulses detected within each sampling interval, i.e. the system is operating in the higher of the two velocity ranges.

Line (A) shown in FIG. 4 illustrates a sampling interval and the sampling pulses bounding that interval as defined by the sampling signal produced by the generator 21. The sampling pulses have a constant rate and therefore each interval will have the same sampling time interval $T_0$. In this example, the sampling interval $T_0$ is 1.0368 msec. Sated another way, in this example, the constant sampling rate is approximately 965 hz. The active sampling interval $T_0$ is bounded by one of the sampling pulses at each edge.

The tachometer may be associated with the source reel (S) or the take-up reel (T) of the tape drive. Line (B) of FIG. 4 is an impulse diagram showing a sequence of pulses representing one edge of the A or B tachometer signal from the optical encoder 15. For purposes of discussion, the drawing shows the last of the pulses occurring prior to the active sample interval $T_0$, a number of tachometer pulses within that interval, and one of the pulses that will follow the end of the active sample interval $T_0$.

The system includes a tach counter in logic 19 or implements such a counter in software as executed by the processor of the microcontroller 31. In this mode, the counter is reset to 0 at the start of the active sample interval $T_0$, and the counter increments the count by 1 in response to each tachometer pulse shown on line (B) of the drawing detected during active sample interval $T_0$. Line (C) of FIG. 4 illustrates the counting and shows the value of the tach counter at the various stages of its operation during the exemplary interval $T_0$. At the end of the active sample interval $T_0$, the counter contains a number corresponding to the number of pulses detected during that interval. In the example illustrated, the count for a preceding interval was m, and during the active interval the counter counted n pulses.

At the end of each sample interval, the logic or processor will shift the count value from the tach counter to a register identified as TCNT, as shown in line (D) of FIG. 4. During an actual interval, the TCNT register will contain the count value for the pulses detected during the immediately preceding sample interval. The pulse count for the active interval $T_0$ is n, in the example, and the processor shifts that value to the TCNT register after the end of the interval $T_0$. The logic 19, for example, may output the TCNT register value as the coarse count, in the high-speed operation mode. The calculations by the circuit 25, regarding the velocity measurement, are based on the latest value of the count, as it appears in the TCNT register. For example, for the illustrated period $T_0$, the calculation is performed after the end of that period, using the count value n resident in the TCNT register.

FIG. 4 also illustrates the fine measurements of the differences or fractions as they appear between the tachometer pulses and the edges of the sample interval $T_0$. Line (E) represents the periods measured and values stored in a frac count register T2S, to represent the differential delays. Line (F) represents pulses of the high-speed clock clk used in the fine counting function, to measure the fractional delays. The high-speed clock operates at a constant rate that is a multiple of the sampling rate. Preferably, the high-speed clock rate is at least one order of magnitude higher than the sampling rate, for example, at approximately 10 times the sampling rate.

In operation, the logic 19 will reset the frac count register upon detection of each tachometer pulse, and the logic may reset the count value in this register in response to each detection of an edge of a sample interval. In operation, the frac register counts the high-speed clock pulses between tachometer pulses. When an edge of a sampling interval is detected between tachometer pulses, the value then accumulated by the counting in the frac count register is stored as a representation of the time delay between the preceding tachometer pulse and the edge of the sample interval. Measurements of this type, taken from before the active sampling interval and at the end of the active interval are output as fine counts, for use by the computation circuit 25 in the velocity calculation.

In the illustrated example, the operation of the frac count register produces a time delay value $T_{frac-bef}$ representing the delay period between the last pulse detected before the beginning of the sampling interval $T_0$. The frac count register also is used to produce a time delay value $T_{frac-now}$ for the delay period between the last pulse detected within the sampling interval $T_0$ and the end of the interval $T_0$. Line (F) also illustrates that a short time after the end of the interval $T_0$, the processor calculates a value related to the rotational velocity, in this case the actual reel speed, for example for purposes of servo control feedback to the motor.

The circuit 25 executes an algorithm to calculate the feedback signal or value (Fbk Speed) based on the coarse and fine count values. In the example under consideration with respect to FIG. 4, the velocity computation is based on the pulse count detected during the interval as represented by the latest value in the TCNT register. The computation also utilizes the length of time $T_0$ of the sampling interval, and the difference between the time delay value $T_{frac-bef}$ for the delay period before the beginning of the sampling interval and the time delay value $T_{frac-now}$ for the delay at the end of the interval. To calculate the reel speed as the value related to velocity, the processor may execute the following computation:

$$\text{Reel Speed:} \frac{TCNT}{[T_o + (Tfrac\_bef - Tfrac\_now)]} \tag{1}$$

The system executes a somewhat different routine at slower speeds. For this purpose, the processor or logic circuitry may distinguish speed ranges based on the number of tachometer pulse counts per sampling interval or the number of sampling intervals per tachometer pulse. At the slower speeds, there may be a single tachometer pulse within a given sampling interval, or some sampling intervals may not include detection of any tachometer pulses because the period between pulses at the slow speed is greater than the sampling period produced by the constant sampling rate.

Figure 5:
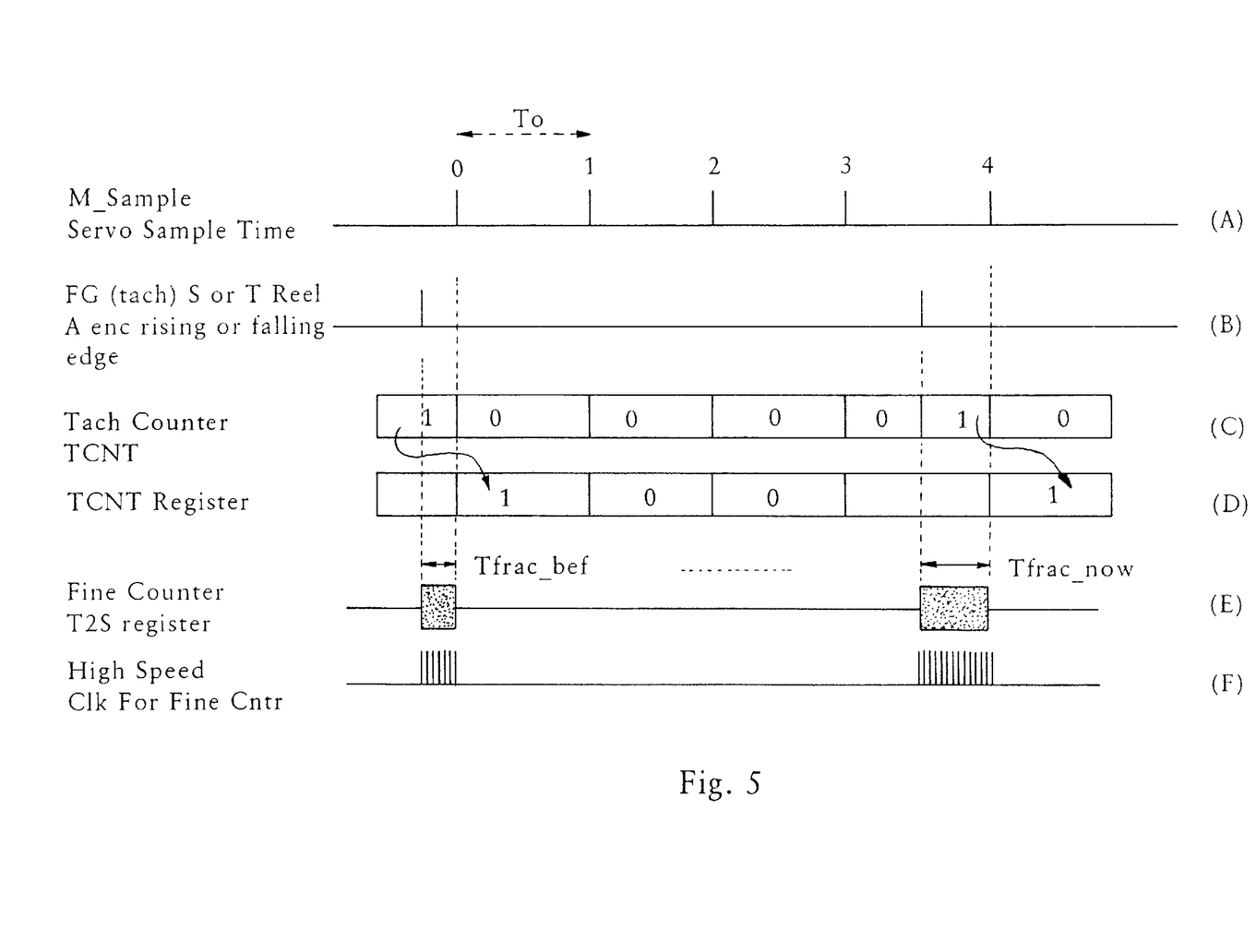
FIG. 5 is a signal diagram useful in explaining the steps of measuring rotational velocity, in the lower of two ranges, in accord with the present invention.

FIG. 5 is generally similar to FIG. 4, except that FIG. 5 relates to the processing involved in velocity measurements when the motor and tape drive are operating in the lower-speed range. FIG. 5 shows a number of different signals and the timing relationships thereof, involved in a velocity measurement during such low-speed operation. In the example shown in FIG. 5 it is assumed that the shaft velocity is sufficiently low that one or more sample intervals pass between two successive tachometer pulses.

Line (A) shown in FIG. 5 illustrates a series of sampling intervals involved in a velocity measurement between two tachometer pulses, five of which are shown for discussion. Line (B) shows the tachometer pulse waveform. Again, the sampling pulses (A) have a constant rate and therefore each interval will have the same sampling time interval $T_0$. In this example, the 965 hz sampling rate results in a constant sampling interval To of 1.0368 msec.

Each sampling interval To is bounded by one of the sampling pulses at each edge. The five pulses (A) define the boundaries of four sampling intervals at least a portion of which is between the time of detection of the first tachometer pulse and the time of detection of the next tachometer pulse. In the illustrated example, the first tachometer pulse (0) precedes the leading edge of the first sampling interval. The first, second and third intervals pass without detection of any tachometer pulses. The next succeeding tachometer pulse is detected during the fourth interval, that is to say before the trailing edge or end of the last sampling interval.

The logic 19 includes a tach counter or implements such a counter in software as executed by the central processor of microcontroller 31. As in the earlier measurement, the tach counter is reset to 0 at the start of the active sample interval $T_0$, and the counter increments the count by 1 in response to each detection of a tachometer pulse from line (B) during active sample interval $T_0$. At the end of the active sample interval $T_0$, the counter contains a number corresponding to the number of pulses detected during that interval. Line (C) of FIG. 5 illustrates the counting and shows the value of the counter at the various stages of its operation during the sampling intervals. At the end of each interval, the count value is shifted to the TCNT register as shown in line (D).

In this example, during a preceding interval, the system detected one tachometer pulse only, and the processor shifts the value 1 into the TCNT register just after the beginning of the first of the intervals shown, i.e. just after the 0 sample pulse and resets the tach counter to 0. When timing reaches the next sample pulse 1, at the end of the first interval, the tach counter has not been incremented because there was no tachometer pulse during that interval. The processor therefore shifts the value 0 into the TCNT register after the sample timing pulse 0. When timing reaches the next sample pulse 2, at the end of the second interval, the tach counter again has not been incremented because there was no tachometer pulse during that interval. The processor therefore shifts the value 0 into the TCNT register after the sample timing pulse 2. A similar routine is executed for the third interval, in this example. During the fourth sample interval, between the fourth and fifth pulses of the sample clock (A), the system detects the next tachometer pulse. After the end of that interval, the processor shifts the value 1 into the TCNT register.

As part of this processing, the processor will detect and count each interval after the first tach pulse up to and including the interval containing the second tach pulse. In the example, the processor will count the first interval (ending with pulse 1 on the (A) line), the second interval, the third interval and the fourth interval (ending with pulse 4 on the (A) line). The interval count is a value n, which equals 4 in this example.

Concurrently with the above operations, the processor also conducts fine measurements regarding the phase delay between the tachometer pulses and the edges or boundaries of one or more sample intervals. FIG. 5 illustrates the fine measurements of the differences as they appear between the two succeeding tachometer pulses and the leading edge of the first sample interval or the trailing edge of the last sample interval. Line (E) represents the periods measured and values stored in a fine counter register T2S, as representations of the different delays. Line (F) represents pulses of the high-speed clock used in the counting function, to measure the actual time delays.

In operation, the processor will reset the T2S register and initiate clock cycle counting upon detection of each tachometer pulse. The processor or counting logic stops this counting operation in response to the next subsequent sample pulse (A) representing an edge of a sample interval. In the low-speed mode of operation, the fine count register T2S counts the high-speed clock pulses between each tachometer pulse and the next sample interval boundary. For each tachometer pulse, the processor or computation circuit will also maintain or store the T2S count value for the immediately preceding tachometer pulse.

After the processing relating to two of the tachometer pulses and the relevant sampling intervals, the processor will have a count n of sampling intervals as well as two delay values from the T2S counter. The first T2S count value relates to $T_{frac\_bef}$, the delay period between the first pulse and the leading edge (0 pulse) of the first sample interval after that tachometer pulse. The second T2S count value relates to $T_{frac\_now}$, the delay period between the second pulse and the trailing edge (4 pulse) of the sample interval in which the second pulse was detected. A short time after the end of that interval, the processor or computation circuit calculates a value related to the rotational velocity, in this case the actual reel speed, for example for purposes of servo control feedback to the motor 11 as in FIG. 1.

In the low-speed example under consideration at this point, the velocity computation is based on the total time for the sample intervals, represented by the count n multiplied by the time period $T_0$ of each sample interval. The computation also is based on the difference between the time delay values $T_{frac\text{-}bef}$ and $T_{frac\text{-}now}$. To calculate the reel speed as the value related to velocity, the processor may execute the following computation:

$$\text{Reel Speed: } \frac{1}{[(n) * T_o + (\text{Tfrac\_bef} - \text{Tfrac\_now})]} \quad (2)$$

The above computations of reel speed or shaft velocity utilized actual time measurements. As such, the computations represent actual speeds, and the processing of the several count values entails a conversion from the count to the corresponding real-time value. For example, each sample interval counted for the low-speed computation represents a time period of $T_0$, hence the value in equation 2 is dependent of the number of intervals n times that time period. Similarly, the processor will convert the clock counts derived for the delay measurements to the corresponding time values $T_{frac\text{-}bef}$ and $T_{frac\text{-}now}$. This approach will produce the desired accuracy of measurement, over the desired bandwidth, and it will enable such operation over a wide range of speeds. The computations based on such time values, however, require floating-point computation capabilities. Microcontrollers with such capabilities are readily available, but the cost thereof is not attractive for use in low-priced mass-production devices such as controllers for digital tape drives.

It is preferred to utilize actual count values and simpler computations, to avoid use of floating-point mathematics and thereby enable the use of lower cost microcontrollers. For this purpose, it is preferred that the processor calculate an arbitrary value related to the shaft velocity, rather than the actual reel speed. A number of different relationships to speed could be used. Preferably, the feedback value is proportional to the reel speed. In one practical embodiment, the value $wT_{u\_fbk}$ is used in place of the Fbk Speed signal. The value $wT_{u\_fbk}$ is proportional to the reel speed, and the constant of this proportionality is the sample interval or period $T_0$. Expressed as an equation, this means that:

$$wTU\_fbk = \text{Reell Speed} * T_0 \quad (3)$$

The sample interval or period $T_0$, however, may be expressed as a function of the number of high-speed clock pulses $N_0$ per interval times the time period $T_{clk}$ of a cycle of the high-speed clock (line (F) of FIGS. 4 and 5). This results in the equation:

$$T_0 = N_0 * Tclk \quad (4)$$

In a similar manner, it is possible to express the measured delay times in terms of their respective count values multiplied by the time period $T_{clk}$ of a cycle of the high speed clock. The delay values for before and now become:

$$Tfrac\_bef = Nfrac\_bef * Tclk \quad (5)$$

$$Tfrac\_now = Nfrac\_now * Tclk \quad (6)$$

By substituting these expressions for various time-based values in the equations (1) and (2) and then canceling out common time period factors, we derive corresponding expressions for the value $wT_{u\_fbk}$ in the different modes based on count values, as shown below.

$$wTu\_fbk: \frac{Ntach}{1 + \frac{(\text{Nfrac\_bef} - \text{Nfrac\_now})}{N_o}} \quad (7)$$

$$wTu\_fbk: \frac{1}{n + \frac{(\text{Nfrac\_bef} - \text{Nfrac\_now})}{N_o}} \quad (8)$$

Equation (7) applies for the higher speed mode of operation. The equation (8) provides the feedback value for slow speed operation, typically when there is no tachometer pulse for one or more sample intervals. As shown by the equations (7) and (8), the computations of the $wT_{u\_fbk}$ values use only the actual count values as inputs. The count values are whole numbers. The resultant computations do not utilize any expression of time or period in fractions of a second, and as such, a processor can perform these computations without floating-point processing.

The control loop, for servo control of the motor, functions exactly the same as if using the time-based speed calculations of equations (1) and (2) except for modifications to compensate for the inherent gain of the factor of $T_0$ (equation (3)). The Ref Speed value would be appropriately adjusted to correspond to a value related to the desired speed by a factor of $T_0$. The motor speed control algorithm implemented in the circuit 29 would allow for the resulting gain in the error signal computation.

Those skilled in the art will recognize that the present invention admits of a number of modifications, within the spirit and scope of the inventive concepts. While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A rotational velocity measurement method, comprising:
    generating a predetermined number of tachometer pulses during each revolution of a shaft driven by a motor;
    sampling for tachometer pulses at a constant predetermined sampling rate;
    if there are a plurality of tachometer pulses within each sample interval:
        a) measuring a delay between a last tachometer pulse detected before the start of one sample interval and the start of the one sample interval;
        b) counting one or more tachometer pulses during the one sample interval;
        c) measuring a delay between a last tachometer pulse detected during the one sample interval and the end of the one sample interval; and
        d) calculating a first value related to rotational shaft velocity from the pulse count and the difference between the delays measured in substeps (a) and (c); and
    if there are not a plurality of tachometer pulses within each sample interval:
        1) measuring a delay between a first tachometer pulse and the start of a next subsequent sample interval;
        2) counting one or more sample intervals extending through detection of a second tachometer pulse;
        3) measuring a delay between the second tachometer pulse and the start of a next subsequent sample interval; and
        4) calculating a second value related to rotational shaft velocity from the interval count and the difference between the delays measured in substeps (1) and (3),
    wherein:
    the first value comprises a ratio of the pulse count to the sum of the sample interval and the difference between the delays measured in substeps (a) and (c); and
    the second value comprises the inverse of the sum of the sample interval count and the difference between the delays measured in substeps (1) and (3).

2. A method as in claim 1, further comprising a step of controlling the motor in response to one of the calculated values, wherein the shaft is coupled to a reel of a digital tape drive, and the control of the motor controls tape speed through the digital tape drive.

3. A method as in claim 1, wherein each measuring of a delay comprises counting clock signals of a relatively high rate during a respective delay.

4. A rotational velocity measurement method, comprising:
    generating a predetermined number of tachometer pulses during each revolution of a shaft driven by a motor;
    sampling for tachometer pulses at a constant predetermined sampling rate;
    if there are a plurality of tachometer pulses within each sample interval:
        a) measuring a delay between a last tachometer pulse detected before the start of one sample interval and the start of the one sample interval;
        b) counting one or more tachometer pulses during the one sample interval;
        c) measuring a delay between a last tachometer pulse detected during the one sample interval and the end of the one sample interval; and
        d) calculating a first value related to rotational shaft velocity from the pulse count and the difference between the delays measured in substeps (a) and (c); and
    if there are not a plurality of tachometer pulses within each sample interval:
        1) measuring a delay between a first tachometer pulse and the start of a next subsequent sample interval;
        2) counting one or more sample intervals extending through detection of a second tachometer pulse;
        3) measuring a delay between the second tachometer pulse and the start of a next subsequent sample interval; and
        4) calculating a second value related to rotational shaft velocity from the interval count and the difference between the delays measured in substeps (1) and (3),
    wherein:
    each measuring of a delay comprises counting clock signals of a relatively high rate during a respective delay;
    the first value comprises the pulse count divided by a denominator corresponding to one plus the ratio of the difference between the clock counts during the delays measured in substeps (a) and (c) to clock cycles per sample interval; and
    the second value comprises the inverse of the sum of the sample interval count plus the ratio of the difference between the clock counts during the delays measured in substeps (1) and (3) to clock cycles per sample interval.

5. A rotational velocity measurement system, comprising:
    a tachometer, for coupling to a shaft rotated by a motor, the tachometer generating a predetermined number of pulses in response to each rotation of the shaft;
    a clock circuit generating a clock signal; and
    circuitry responsive to the tachometer pulses and the clock signal for: sampling for tachometer pulses during sampling intervals defining a constant sampling rate lower than the clock signal, counting cycles of the clock signal to measure delays between certain ones of the pulses and next subsequent sample interval boundaries and calculating a value related to rotational velocity of the shaft as a function of a count derived from the pulse sampling and a difference between two of the measured delays,
    wherein the tachometer comprises an optical encoder adapted for coupling to a drive shaft of a tape reel of a digital tape drive.

6. A system as in claim 5, wherein the circuitry generates a signal based on the value, for controlling speed of the motor.

7. A system as in claim 5, wherein if the rotational speed is substantially at or above a predetermined threshold, the count derived from the pulse sampling comprises a count of tachometer pulses detected during a single sampling interval.

8. A system as in claim 7, wherein if the rotational speed is substantially at or below the predetermined threshold, the count derived from the pulse sampling comprises a count of sample intervals from detection of a first tachometer pulse through detection of a second tachometer pulse succeeding the first tachometer pulse.

9. A system as in 5, wherein if a predetermined criteria is satisfied:
  the circuitry measures a first of said delays with respect to a beginning of one sampling interval and measures a second of said delays with respect to an end of the one sampling interval; and
  the value calculated by the circuitry comprises a count of tachometer pulses detected during the one sampling interval divided by the sum of the time period of one sampling interval and the difference between the first and second measured delays.

10. A rotational velocity measurement system, comprising:
  a tachometer, for coupling to a shaft rotated by a motor, the tachometer generating a predetermined number of pulses in response to each rotation of the shaft;
  a clock circuit generating a clock signal; and
  circuitry responsive to the tachometer pulses and the clock signal for: sampling for tachometer pulses during sampling intervals defining a constant sampling rate lower than the clock signal, counting cycles of the clock signal to measure delays between certain ones of the pulses and next subsequent sample interval boundaries and calculating a value related to rotational velocity of the shaft as a function of a count derived from the pulse sampling and a difference between two of the measured delays, wherein if a predetermined criteria is satisfied:
  the circuitry measures a first of said delays as a count of cycles of the clock signal between a tachometer pulse preceding a beginning of one sampling interval and the beginning of the one sampling interval;
  the circuitry measures a second of said delays as a count of cycles of the clock signal between a last tachometer pulse detected within the one sampling interval and an end of the one sampling interval; and
  the value calculated by the circuitry comprises a count of tachometer pulses detected during the one sampling interval divided by: one plus the ratio of (1) the difference in the clock cycles counts measured for the first and second delays to (2) the number of clock cycles per sampling interval.

11. A rotational velocity measurement system, comprising:
  a tachometer, for coupling to a shaft rotated by a motor, the tachometer generating a predetermined number of pulses in response to each rotation of the shaft;
  a clock circuit generating a clock signal; and
  circuitry responsive to the tachometer pulses and the clock signal for: sampling for tachometer pulses during sampling intervals defining a constant sampling rate lower than the clock signal, counting cycles of the clock signal to measure delays between certain ones of the pulses and next subsequent sample interval boundaries and calculating a value related to rotational velocity of the shaft as a function of a count derived from the pulse sampling and a difference between two of the measured delays, wherein if a predetermined criteria is satisfied:
  the circuitry measures a first of said delays between a first detected tachometer pulse and a beginning of one sampling interval;
  the circuitry measures a second of said delays between a second tachometer pulse detected in succession following the first detected tachometer pulse and an end of the one sampling interval or a later sampling interval which contains the second tachometer pulse;
  the count derived from the pulse sampling comprises a count of one or more sample intervals from detection of the first tachometer pulse through detection of the second tachometer pulse; and
  the value calculated by the circuitry comprises the inverse of the sample interval count multiplied by the period of a sample interval, summed together with the difference between the first and second measured delays.

12. A rotational velocity measurement system, comprising:
  a tachometer, for coupling to a shaft rotated by a motor, the tachometer generating a predetermined number of pulses in response to each rotation of the shaft;
  a clock circuit generating a clock signal; and
  circuitry responsive to the tachometer pulses and the clock signal for: sampling for tachometer pulses during sampling intervals defining a constant sampling rate lower than the clock signal, counting cycles of the clock signal to measure delays between certain ones of the pulses and next subsequent sample interval boundaries and calculating a value related to rotational velocity of the shaft as a function of a count derived from the pulse sampling and a difference between two of the measured delays, wherein if a predetermined criteria is satisfied:
  the circuitry measures a first of said delays as a count of cycles of the clock signal between a first detected tachometer pulse and a beginning of one sampling interval;
  the circuitry measures a second of said delays as a count of cycles of the clock signal between a second tachometer pulse detected in succession following the first detected tachometer pulse and an end of the one sampling interval or a later sampling interval which contains the second tachometer pulse;
  the count derived from the pulse sampling comprises a count of one or more sample intervals from detection of the first tachometer pulse through detection of the second tachometer pulse; and
  the value calculated by the circuitry comprises the inverse of: the sum of (1) the sample interval count, plus (2) the difference in the clock cycle counts measured for the first and second delays divided by the number of clock cycles per sampling interval.

* * * * *